United States Patent [19]

Devereux

[11] 4,199,826
[45] Apr. 29, 1980

[54] PORTABLE TOILET COMBINATION

[76] Inventor: Eileen Devereux, 86 Ft. Washington Ave., New York, N.Y. 10032

[21] Appl. No.: 821,746

[22] Filed: Aug. 4, 1977

[51] Int. Cl.² ............................................. A47K 11/02
[52] U.S. Cl. ......................................... 4/116; 4/142; 190/42
[58] Field of Search .................. 4/111, 110, 142, 116, 4/112; 190/52, 42

[56] References Cited

U.S. PATENT DOCUMENTS

| 550,237 | 11/1895 | Alexander | 190/52 |
|---|---|---|---|
| 803,732 | 11/1905 | Turner | 190/52 |
| 2,213,821 | 9/1940 | McCurdy | 190/52 |
| 3,142,847 | 8/1964 | Kurrels | 4/142 |
| 3,428,967 | 2/1969 | Hughes | 4/142 |

Primary Examiner—Lenard A. Footland
Attorney, Agent, or Firm—Charles J. Speciale

[57] ABSTRACT

A portable toilet combination, particularly suitable for children, but also useable by adults, comprising an openably closed carrying case with exteriorly accessible first, second, third and fourth compartments; the first compartment for containing a disposable waste receptacle; the second compartment for temporarily containing soiled waste receptacles; the third compartment for containing cleaning tissues; and the fourth compartment for containing new unused waste receptacles.

2 Claims, 5 Drawing Figures

PORTABLE TOILET COMBINATION

BACKGROUND OF THE INVENTION

1. Field of the Invention

This invention relates to portable toilets generally and particularly to a portable toilet carrying case containing all the accouterments.

2. Description of the Prior Art

There are a number of disclosed portable toilets with disposable bags or waste receptacles. For example, those disclosed in U.S. Pat. Nos. 2,685,399; 2,801,426; 3,452,368; 3,495,278; 3,588,921; 3,579,655; 3,643,266; 3,648,302; and 3,723,999 are fairly representative of the same. None of the foregoing, however, disclose a truly portable toilet which handily carried and is a complete self-contained unit complete with a waste receptacle, a waste receptacle supply, a tissue supply and a temporary storage area for used waste receptacles.

SUMMARY OF THE INVENTION

It is, therefore, among one of the principal objectives of this invention to provide a truly portable toilet.

In accord with the invention there is now provided a portable toilet combination comprising an openably closed carrying case with exteriorly accessible first, second, third, and fourth compartments. The first compartment contains a disposable waste receptacle for use; the second is for temporary storage of soiled waste receptacles; the third is for a cleaning tissue supply; and, the fourth is new and unsoiled waste receptacles. All compartments are accessible to the outside by means of hinged covers which are releasably lockable, the first and second compartments accessible from the top of the carrying case, and the third and fourth compartments accessible from the end of the carrying case. This invention is particularly suited for children while traveling, however, adults may utilize it also.

BRIEF DESCRIPTION OF THE DRAWING

The invention will be hereinafter more fully described with reference to the accompanying drawing in which.

DESCRIPTION OF THE PREFERRED EMBODIMENTS

Figure 1:
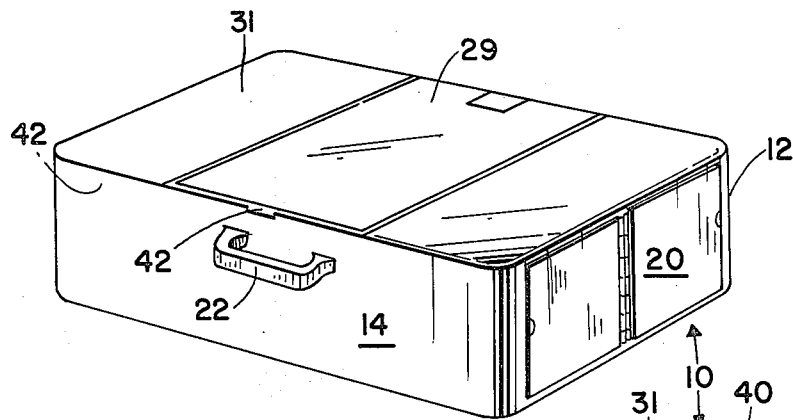
FIG. 1 is a view in perspective of the closed carrying case.
Figure 2:
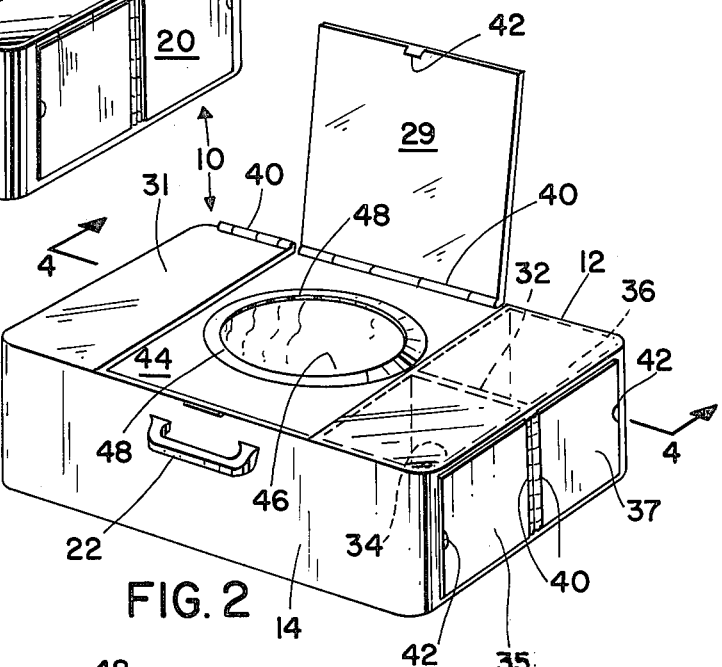
FIG. 2 is a similar view except showing one of the hinged top covers in the opened position.
Figure 3:
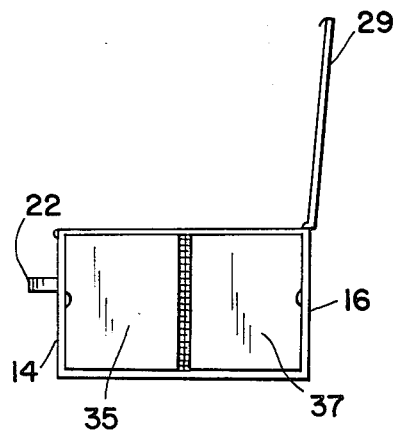
FIG. 3 is an end view of the device shown in FIG. 1.
Figure 4:
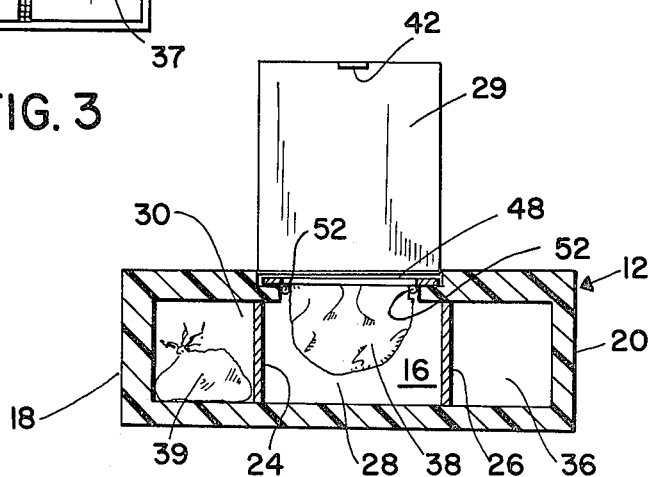
FIG. 4 is a sectional view taken along line 4—4 of FIG. 2.
Figure 5:
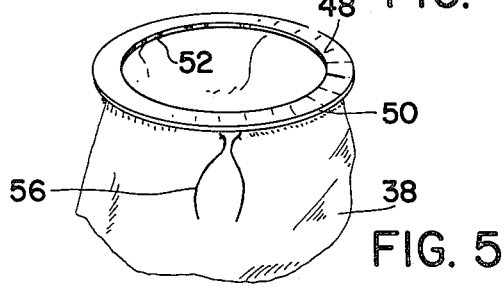
FIG. 5 is a perspective view of the disposable waste receptacle used with the portable toilet of the invention.

Referring now to the figures of the drawing there is illustrated therein the portable toilet 10 of the invention (hereinafter referred to as "toilet"). Toilet 10 further comprises a rectangular (or square) carrying case 12 having a pair of parallel opposing elongated sides 14 and 16, the front and rear sides, respectively, and a pair of parallel opposing ends 18 and 20. A handle 22 is mounted on the front side so that when fully closed the toilet resembles an ordinary suitcase.

Interior partitions define four compartments inside carrying case 12. A pair of parallel opposing transverse partitions 24 and 26 define a first compartment 28 and a second compartment 30. In turn a longitudinal partition 32 intersecting transverse partition 26 at about midpoint defines a third compartment 34 and fourth compartment 36. The first compartment 28 houses a bag-like waste receptacle 38, in a manner that will be further described hereinbelow. Second compartment is for temporary storage of soiled waste receptacles 39, while third compartment 34 is for storage of cleaning tissues (not shown) and fourth compartment 36 is for storage of a pile of new or unused waste receptacles 38.

All of the compartments are made accessible from the outside by means of hinged covers: a first top hinged cover 29 for the first compartment 28; a second top hinged cover 31 for the second compartment 30; a third end hinged cover 35 for the third compartment 34; and, a fourth end hinged cover 37 for the fourth compartment 36. All covers are hingably openable by hinges 40, and releasably lockable by snap latches 42. The hinges and the snap latches are of course conventional.

The first compartment 28 is further adapted by having an inside cover 44, provided with a circular opening 46 into which waste receptacle 38 is insertable. A cardboard of plastic collar 48 surrounds the opening 46 and also snaps the circular edge 50 into place inside the opening by means of its own tubular projection 52. The edge 50 is preferably overlapped over the opening so that the projection 52 can snap it forceably into place against the rim of the opening. Thus, a seat is provided for the toilet user. A drawstring 56 is also provided at the top of the receptacle. Thus, to remove the waste receptacle 38 after use the collar 48 is removed, the drawstring is drawn up tight closing the receptacle 39 and it is then stored in second compartment 30 until it can be thrown away. A deodorant bar can be kept inside the second compartment to keep the air inside the carrying case fresh.

The carrying case 12 can be made of any suitable suitcase material e.g. plastic, or even leather, so that when traveling in the closed condition (FIG. 1) it looks like an ordinary suitcase. It can be made narrow enough to fit under a car seat out of the way as well. It can be used at home also with an ordinary metal "potty" as well. Thus, what has been provided by this invention is a truly portable toilet which is easily carried and is a complete self contained unit.

What is claimed is:

1. A portable toilet combination comprising an openably closed carrying case having a pair or parallel opposing sides, defining a front and a rear side, and a pair of parallel opposing ends, a handle being mountable on said front side, interior partitions inside said carrying case defining four separate compartments, a pair of said defining a first compartment and a second compartment, a longitudinally oriented partition intersecting one of said transverse partitions defining a third and fourth compartment, said four separate compartments being exteriorly accessible, said first and second compartments being accessible by means of hinged top covers and said third and fourth compartments being accessible by means of hinged end covers, all said covers being releasably lockable, said first compartment being adapted to house a waste receptacle for waste disposal use, said second compartment being capable of receiving and storing cleansing tissues, and said fourth compartment being capable or receiving and storing a plurality of waste receptacles, and wherein an additional cover is provided for said compartment, said additional cover being an inside cover under said hinged top cover, said inside cover having an opening into said compartment, said waste receptacle being insertable into said opening, a collar over said opening to provide a seat for said first compartment for a toilet user.

2. A portable toilet according to claim 1 wherein said collar has a tubular projection for removably securing the edge of said waste receptacle.

* * * * *